United States Patent
Kang et al.

(10) Patent No.: US 8,970,813 B2
(45) Date of Patent: Mar. 3, 2015

(54) OPTICAL COMPENSATION FILM GROUP AND METHOD FOR REDUCING LIGHT LEAKAGE OF VERTICAL ALIGNMENT LCD USING THE SAME

(71) Applicant: Shenzhen China Star Optoelectronics Technology Co., Ltd., Shenzhen, Guangdong (CN)

(72) Inventors: Chih-Tsung Kang, Shenzhen (CN); Bo Hai, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 245 days.

(21) Appl. No.: 13/697,854

(22) PCT Filed: Sep. 28, 2012

(86) PCT No.: PCT/CN2012/082309
§ 371 (c)(1),
(2) Date: Nov. 14, 2012

(87) PCT Pub. No.: WO2014/043943
PCT Pub. Date: Mar. 27, 2014

(65) Prior Publication Data
US 2014/0192304 A1 Jul. 10, 2014

(30) Foreign Application Priority Data

Sep. 24, 2012 (CN) .......................... 2012 1 0358045

(51) Int. Cl.
*G02F 1/1335* (2006.01)
*G02F 1/1337* (2006.01)
*G02F 1/1333* (2006.01)
*G02F 1/13363* (2006.01)

(52) U.S. Cl.
CPC ....... *G02F 1/133362* (2013.01); *G02F 2413/12* (2013.01); *G02F 1/133634* (2013.01); *G02F 2001/133742* (2013.01); *G02F 2413/04* (2013.01); *G02F 2413/05* (2013.01); *G02F 2413/06* (2013.01)
USPC ........... 349/119; 349/117; 349/118; 349/123; 349/130

(58) Field of Classification Search
CPC .......... G02F 1/13363; G02F 1/133634; G02F 2413/02; G02F 1/1393; G02F 2413/12; G02F 2413/08; G02F 2001/133742; G02F 2001/133757; G02F 2001/133776; G02B 5/3083; B29K 2001/00; B29K 2001/12
USPC .................................. 349/117–119, 123–130
See application file for complete search history.

(56) References Cited

U.S. PATENT DOCUMENTS 5,499,126 A * 3/1996 Abileah et al. ................. 349/106
8,134,663 B2 * 3/2012 Uehara et al. .................. 349/117
2009/0257012 A1 * 10/2009 Sabae et al. .................... 349/118

*Primary Examiner* — Hoan C Nguyen
(74) *Attorney, Agent, or Firm* — Andrew C. Cheng (57) ABSTRACT

The present invention provides an optical compensation film group and a method for reducing light leakage of a vertical alignment LCD using the same. For the vertical alignment LCD at a wavelength of 550 nm, an LCΔnd in the range of [305.8 nm, 324.3 nm], and a pretilt angle in the range of [85°, 90°), a compensation value Ro of an in-plane optical path difference of the biaxial compensation film is in the range of 48 nm≤Ro≤84 nm, and a compensation value Rth of an out-of-plane optical path difference of the biaxial compensation film is in the range of 160 nm≤Rth≤280 nm, and a TAC compensation film having a compensation value Rth is in the range of Y1≤Rth≤Y2. The present invention can effectively improve the serious light leakage caused by the conventional compensation structure with a single biaxial compensation film, the contrast and sharpness at the large viewing angles, and the costs.

8 Claims, 4 Drawing Sheets

| PVA (polyvinyl alcohol) compensation film |
|---|
| TAC 2 (cellulose triacetate) compensation film |
| VA (vertical alignment) cell unit |
| TAC 1 (cellulose triacetate) compensation film |
| Biaxial compensation film |
| PVA (polyvinyl alcohol) compensation film |

| TAC (cellulose triacetate) compensation film |
|---|
| PVA (polyvinyl alcohol) compensation film |
| TAC (cellulose triacetate) compensation film |
| PSA (pressure sensitive adhesive) compensation film |
| VA (vertical alignment) cell unit |
| PSA (pressure sensitive adhesive) compensation film |
| Biaxial compensation film |
| PVA (polyvinyl alcohol) compensation film |
| TAC (cellulose triacetate) compensation film |

FIG. 1 (prior art)

| TAC (cellulose triacetate) compensation film |
|---|
| PVA (polyvinyl alcohol) compensation film |
| Biaxial compensation film |
| PSA (pressure sensitive adhesive) compensation film |
| VA (vertical alignment) cell unit |
| PSA (pressure sensitive adhesive) compensation film |
| Biaxial compensation film |
| PVA (polyvinyl alcohol) compensation film |
| TAC (cellulose triacetate) compensation film |

FIG. 2 (prior art)

Contour of the light leakage distribution in the dark state

FIG. 3 (prior art)

| PVA (polyvinyl alcohol) compensation film |
| TAC (cellulose triacetate) compensation film |
| VA (vertical alignment) cell unit |
| Biaxial compensation film |
| PVA (polyvinyl alcohol) compensation film |

FIG. 4

| PVA (polyvinyl alcohol) compensation film |
| Biaxial compensation film |
| VA (vertical alignment) cell unit |
| TAC (cellulose triacetate) compensation film |
| PVA (polyvinyl alcohol) compensation film |

FIG. 5

| PVA (polyvinyl alcohol) compensation film |
|---|
| Biaxial compensation film |
| TAC (cellulose triacetate) compensation film |
| VA (vertical alignment) cell unit |
| PVA (polyvinyl alcohol) compensation film |

FIG. 6

| PVA (polyvinyl alcohol) compensation film |
|---|
| VA (vertical alignment) cell unit |
| TAC (cellulose triacetate) compensation film |
| Biaxial compensation film |
| PVA (polyvinyl alcohol) compensation film |

FIG. 7

| PVA (polyvinyl alcohol) compensation film |
|---|
| Biaxial compensation film |
| TAC 1 (cellulose triacetate) compensation film |
| VA (vertical alignment) cell unit |
| TAC 2 (cellulose triacetate) compensation film |
| PVA (polyvinyl alcohol) compensation film |

FIG. 8

| PVA (polyvinyl alcohol) compensation film |
|---|
| TAC 2 (cellulose triacetate) compensation film |
| VA (vertical alignment) cell unit |
| TAC 1 (cellulose triacetate) compensation film |
| Biaxial compensation film |
| PVA (polyvinyl alcohol) compensation film |

FIG. 9

Contour of the light leakage distribution in the dark state

OPTICAL COMPENSATION FILM GROUP AND METHOD FOR REDUCING LIGHT LEAKAGE OF VERTICAL ALIGNMENT LCD USING THE SAME

The claims of this application have submitted to the State Intellectual Property Office of the People's Republic of China (SIPO) on Sep. 24, 2012, Application No. 201210358045.7. The priority right based on the China application has a title of "An optical compensation film group and method for reducing light leakage of a vertical alignment LCD using the same". The entire contents of the above-mentioned patent application will be incorporated in the present application through citing.

BACKGROUND OF THE INVENTION

1. Field of the Invention

The present invention relates to a field of optics, and more particularly to an optical compensation film group and method for reducing light leakage of a vertical alignment LCD using the same.

2. Description of Related Art

As the increasing viewing angle of the Thin-Film-Transistor LCD (TFT-LCD), the contrast of the screen is reduced. The sharpness of the screen is also gradually decreased. This is due to the bi-refractive index of the liquid crystal molecules in the liquid crystal layer changing with the observation angles. By using a wide viewing angle compensation film for compensating, it can effectively reduce light leakage of the screen in the dark state, and within a certain angle, it can greatly improve the contrast of the screen.

The compensation principle of the compensation film is generally correcting the retardation caused by the liquid crystal molecules in the different viewing angles so that the birefringence property of the liquid crystal molecules can obtain a symmetric compensation.

Figure 1:
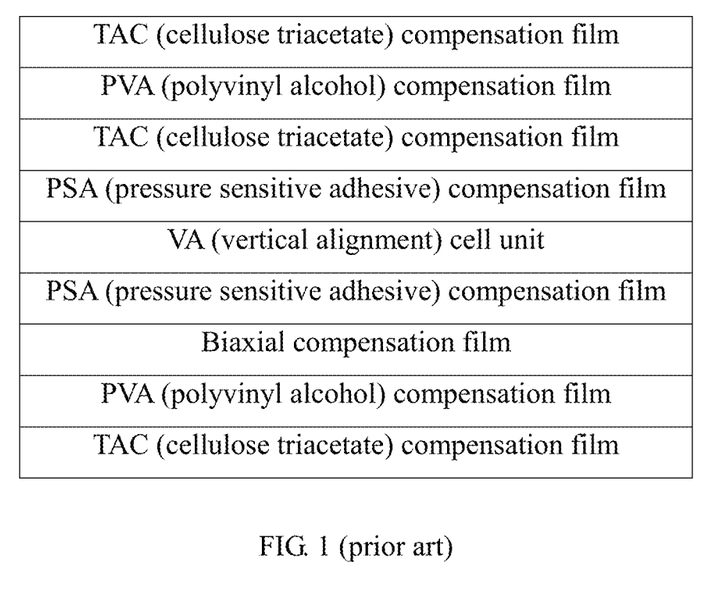
FIG. 1 is a schematic diagram illustrating a compensation structure with a single biaxial compensation film in the prior art.
Figure 2:
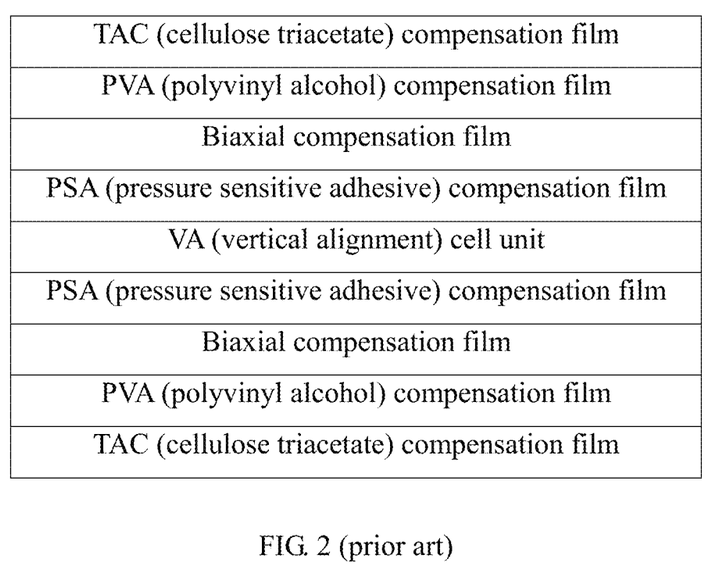
FIG. 2 is a schematic diagram illustrating a compensation structure with a double biaxial compensation film in the prior art.

The compensation films are different for different liquid crystal display modes. The compensation film used in large-size liquid crystal television is for VA (vertical alignment) display mode LCD. In the early, it uses Konica Company's N-TAC film. Subsequently, it uses OPOTES Company's Zeonor film, Fujitsu's F-TAC series films, or Nitto Denko's X-plate film. Conventionally, the common compensation structure with a single biaxial compensation film is shown in FIG. 1 and with a double biaxial compensation film is shown structure shown in FIG. 2. As illustrated, the structure with the single biaxial compensation film is usually followed by a TAC (cellulose triacetate) compensation film, a PVA (polyvinyl alcohol) compensation film, a TAC (cellulose triacetate) compensation film, a PSA (pressure sensitive adhesive) compensation film, a VA (vertical alignment) cell unit, a PSA (pressure sensitive adhesive) compensation film, a biaxial compensation film, a PVA (polyvinyl alcohol) compensation film, a TAC (cellulose triacetate) compensation film. In the compensation structure, there is only one biaxial compensation film so that it is called the compensation structure with a single biaxial compensation film.

By using the double biaxial compensation film for compensation, it can effectively reduce the light leakage of the screen in the dark state so as to improve the contrast and sharpness at a large viewing angle. However, its price is more expensive, and is not conducive to reduce costs. By using the compensation structure with a single biaxial compensation film, it can effectively reduce the costs, but may increase the light leakage of the screen in the dark state.

Figure 3:
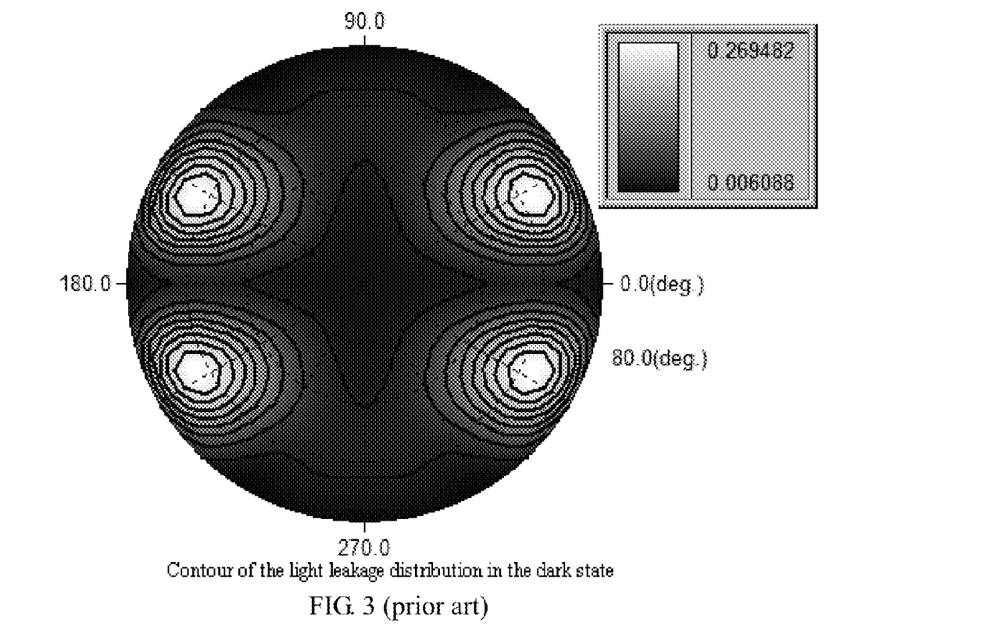
FIG. 3 is a light leakage distribution diagram in dark state generated by a compensation structure with a single biaxial compensation film in the prior art.
Figure 4:
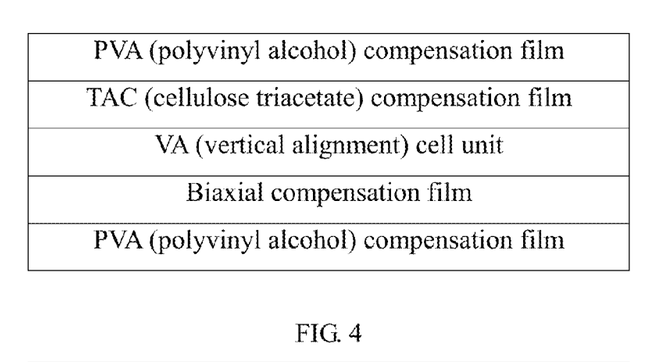
FIG. 4 is a schematic diagram illustrating compensation structure 1 with a single biaxial compensation film in the present invention.
Figure 5:
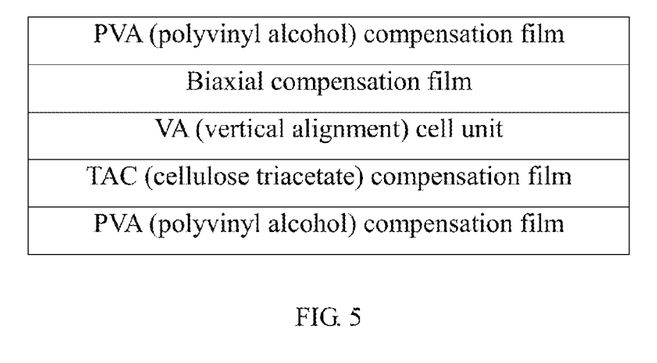
FIG. 5 is a schematic diagram illustrating compensation structure 2 with a single biaxial compensation film in the present invention.
Figure 6:
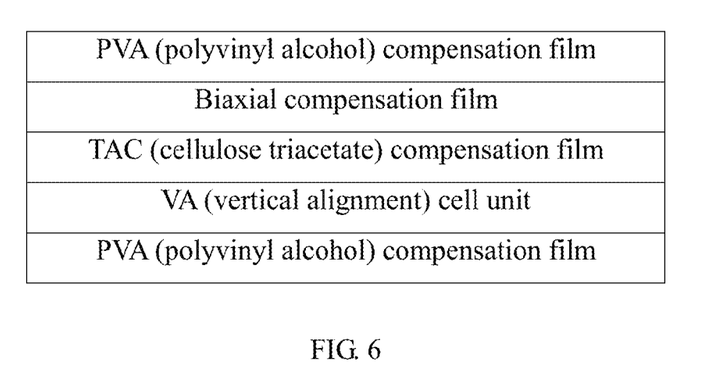
FIG. 6 is a schematic diagram illustrating compensation structure 3 with a single biaxial compensation film in the present invention.
Figure 7:
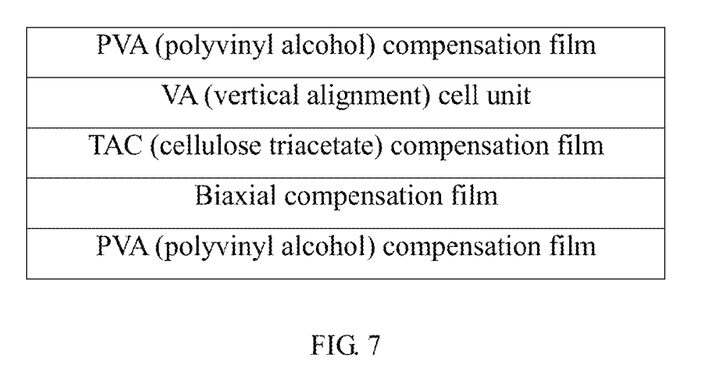
FIG. 7 is a schematic diagram illustrating compensation structure 4 with a single biaxial compensation film in the present invention.

For example, FIG. 3 is a light leakage distribution diagram in dark state generated by a compensation structure with a single biaxial compensation film in the prior art. Wherein, an optical path difference (LCΔnd)=324.3 nm, a liquid crystal pretilt angle=89°, a compensation value Ro of an in-plane optical path difference of the biaxial compensation film=72 nm, a compensation value Rth of an out-of-plane optical path difference of the biaxial compensation film=240 nm, a compensation value Rth of the TAC compensation film=23.6 nm.

As shown FIG. 3, the light leakage of the compensation structure with a single biaxial compensation film is very serious.

How to compensate using the compensation structure with a single biaxial compensation film and to achieve a good compensation effect of the light leakage so as to reduce the costs and the light leakage is a technical problem that needs to be solved.

SUMMARY OF THE INVENTION

The technical problems to be solved by the present invention is to improve the serious light leakage phenomenon in the dark state caused by the compensation structure with a single biaxial compensation film, and to increase the contrast and sharpness at the large view angles (not horizontal, vertical direction view angles).

The present invention is mainly for an optical compensation film group for a vertical alignment LCD, particularly for an LCΔnd in the range of [305.8 nm, 324.3 nm], a pretilt angle in the range of [85°, 90°). By changing the compensation values of the biaxial compensation film and the TAC compensation film of the optical compensation film group is a single layer to reduce the serious light leakage phenomenon in the dark state, the present invention can effectively increase the contrast and sharpness at the large view angles (not horizontal, vertical direction view angles).

Specifically, the present invention is achieved by:

The present invention also provides an optical compensation film group for a vertical alignment LCD, and for the vertical alignment LCD at a wavelength of 550 nm, an LC Δnd in the range of [305.8 nm, 324.3 nm], and a pretilt angle in the range of [85°, 90°), the optical compensation film group comprising:

a biaxial compensation film having a compensation value Ro of an in-plane optical path difference in the range of 48 nm≤Ro≤84 nm and a compensation value Rth of an out-of-plane optical path difference in the range of 160 nm≤Rth≤280 nm; and a TAC compensation film having a compensation value Rth in the range of Y1≤Rth≤Y2, wherein:

$Y1=0.005505x^2-3.25016x+477.1;$ $Y2=-0.00625119x^2+1.762274x+32;$ and x representing the compensation value Rth of the out-of-plane optical path difference of the biaxial compensation film.

Correspondingly, the present invention also provides A method for reducing light leakage of a vertical alignment LCD using optical compensation film group, wherein the optical compensation film group comprises a biaxial compensation film and a TAC compensation film, and for the vertical alignment LCD at a wavelength of 550 nm, an LC Δnd in the range of [305.8 nm, 324.3 nm], and a pretilt angle in range of [85°, 90°], the method comprising steps of:

adjusting a compensation value Ro of an in-plane optical path difference of the biaxial compensation film in the range of 48 nm≤Ro≤84 nm;

adjusting a compensation value Rth of an out-of-plane optical path difference of the biaxial compensation film in the range of 160 nm≤Rth≤280 nm; and adjusting a compensation value Rth of the TAC compensation film in the range of Y1≤Rth≤Y2, wherein:

$$Y1=0.005505x^2-3.25016x+477.1;$$

$$Y2=-0.00625119x^2+1.762274x+32; \text{ and}$$

x representing the compensation value Rth of the out-of-plane optical path difference of the biaxial compensation film.

Wherein, the step of adjusting the compensation value Ro of the in-plane optical path difference of the biaxial compensation film in the range of 48 nm≤Ro≤84 nm and the step of adjusting the compensation value Rth of the out-of-plane optical path difference of the biaxial compensation film in the range of 160 nm≤Rth≤280 nm comprise:

when refractive index values Nx, Ny, Nz of the biaxial compensation film are known, adjusting a thickness d of the biaxial compensation film according to a following formula to produce the compensation value Ro of the in-plane optical path difference of the biaxial compensation film in the range of 48 nm≤Ro≤84 nm and the compensation value Rth of the out-of-plane optical path difference of the biaxial compensation film in the range of 160 nm≤Rth≤280 nm, the formula:

$$Ro=(Nx-Ny)*d$$

$$Rth=[(Nx+Ny)/2-Nz]*d$$

wherein, Nx representing the refractive index value in a X direction which gives a maximum refractive index value in the plane of the biaxial compensation film, Ny representing the refractive index value in a Y direction which is orthogonal to the X direction in the plane of the biaxial compensation film, and Nz representing the refractive index value in a thickness direction of the biaxial compensation film.

Wherein, the step of adjusting the compensation value Rth of the TAC compensation film in the range of Y1≤Rth≤Y2 comprises:

when refractive index values Nx, Ny, Nz of the TAC compensation film are known, adjusting a thickness d of the TAC compensation film according to a following formula to produce the compensation value Rth of the TAC compensation film in the range of Y1≤Rth≤Y2, the formula:

$$Rth=[(Nx+Ny)/2-Nz]*d$$

wherein, Nx representing the refractive index value in a X direction which gives a maximum refractive index value in the plane of the TAC compensation film, Ny representing the refractive index value in a Y direction which is orthogonal to the X direction in the plane of the TAC compensation film, and Nz representing the refractive index in a thickness direction of the TAC compensation film.

Wherein, the step of adjusting the compensation value Ro of the in-plane optical path difference of the biaxial compensation film in the range of 48 nm≤Ro≤84 nm and adjusting the compensation value Rth of the out-of-plane optical path difference in the range of 160 nm≤Rth≤280 nm comprises:

when a thickness d of the biaxial compensation film is known, adjusting refractive index value Nx, Ny, Nz of the biaxial compensation film according to a following formula to produce the compensation value Ro of the in-plane optical path difference of the biaxial compensation film in the range of 48 nm≤Ro≤84 nm, and the compensation value Rth of the out-of-plane optical path difference of the biaxial compensation film in the range of 160 nm≤Rth≤280 nm, the formula:

$$Ro=(Nx-Ny)*d$$

$$Rth=[(Nx+Ny)/2-Nz]*d$$

wherein, Nx representing the refractive index value in a X direction which gives a maximum refractive index in the plane of the biaxial compensation film, Ny representing the refractive index value in a Y direction which is orthogonal to the X direction in the plane of the biaxial compensation film, and Nz representing the refractive index value in a thickness direction of the biaxial compensation film.

Wherein, the step of adjusting the compensation value Rth of the TAC compensation film in the range of Y1≤Rth≤Y2 comprises:

when a thickness d of the TAC compensation film is known, adjusting refractive index values Nx, Ny, Nz of the TAC compensation film according to a following formula to produce the compensation value Rth of the TAC compensation film in the range of Y1≤Rth≤Y2, the formula:

$$Rth=[(Nx+Ny)/2-Nz]*d$$

wherein, Nx representing the refractive index value in a X direction which gives a maximum refractive index value in the plane of the TAC compensation film, Ny representing the refractive index value in a Y direction which is orthogonal to the X direction in the plane of the TAC compensation film, and Nz representing the refractive index value in a thickness direction of the TAC compensation film.

Wherein, the step of adjusting the compensation value Ro of the in-plane optical path difference of the biaxial compensation film in the range of 48 nm≤Ro≤84 nm and adjusting the compensation value Rth of the out-of-plane optical path difference of the biaxial compensation film in the range of 160 nm≤Rth≤280 nm comprises:

adjusting refractive index values Nx, Ny, Nz, and a thickness d of the biaxial compensation film at the same time according to a following formula to produce the compensation value Ro of the in-plane optical path difference of the biaxial compensation film in the range of 48 nm≤Ro≤84 nm and the compensation value Rth of the out-of-plane optical path difference of the biaxial compensation film in the range of 160 nm≤Rth≤280 nm, the formula:

$$Ro=(Nx-Ny)*d$$

$$Rth=[(Nx+Ny)/2-Nz]*d$$

wherein, Nx representing the refractive index value in a X direction which gives a maximum refractive index in the plane of the biaxial compensation film, Ny representing the refractive index value in a Y direction which is orthogonal to the X direction in the plane of the biaxial compensation film, and Nz representing the refractive index value in a thickness direction of the biaxial compensation film.

Wherein, the step of adjusting the compensation value Rth of the TAC compensation film in the range of Y1≤Rth≤Y2 comprises:

adjusting refractive index values Nx, Ny, Nz, and a thickness d of the TAC compensation film at the same time according to a following formula to produce the compensation value Rth of the TAC compensation film in the range of Y1≤Rth≤Y2, the formula:

$$Rth=[(Nx+Ny)/2-Nz]*d$$

wherein, Nx representing the refractive index value in a X direction which gives a maximum refractive index value in the plane of the TAC compensation film, Ny representing the refractive index value in a Y direction which is orthogonal to the X direction in the plane of the TAC compensation film, and Nz representing the refractive index value in a thickness direction of the TAC compensation film.

The beneficial effects of the present invention: The present invention can effectively improve the serious light leakage caused by the conventional compensation structure with a single biaxial compensation film, the contrast and sharpness at the large viewing angles, and the costs.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the skilled persons of ordinary skill in the art without creative effort, it can also obtain other figures according to these figures.

DETAILED DESCRIPTION OF THE PREFERRED EMBODIMENT

The present invention is mainly optical compensation films for a vertical alignment mode LCD, especially for the vertical alignment mode LCD at a wavelength of 550 nm, an LC$\Delta$nd (liquid crystal optical path difference) in the range of [305.8 nm, 324.3 nm], a liquid crystal pretilt angle in the range of [85°, 90°). Through changing compensation value of a biaxial compensation film and a compensation value of a TAC compensation film for the vertical alignment LCD to reduce serious light leakage phenomenon of conventional single biaxial compensation film structure in the dark state. The present invention can effectively increase the contrast and sharpness at the large viewing angles (not horizontal, vertical direction viewing angles).

Specifically, the technical solution of the present invention is achieved in that:

The present invention provides an optical compensation film group for a vertical alignment LCD. Applicable compensation structures for the compensation film group are shown in FIG. 4 to FIG. 9. The compensation film group for the vertical alignment LCD comprises a biaxial compensation film and a TAC compensation film. Wherein, at a wavelength of 550 nm, an LC $\Delta$nd (liquid crystal optical path difference) in the range of [305.8 nm, 324.3 nm], and a liquid crystal pretilt angle in the range of [85°, 90°), a compensation value Ro of an in-plane optical path difference of the biaxial compensation film is in the range of 48 nm$\leq$Ro$\leq$84 nm, and a compensation value Rth of an out-plane optical path difference of the biaxial compensation film is in the range of 160 nm$\leq$Rth$\leq$280 nm, and a compensation value Rth of the TAC compensation film is in the range of Y1$\leq$Rth$\leq$Y2.

Wherein:

$Y1=0.005505x^2-3.25016x+477.1,$ $Y2=-0.00625119x^2+1.762274x+32,$ and x representing the compensation value Rth of the out-of-plane optical path difference of the biaxial compensation film.

Showing by a table as Table 1:

TABLE 1

| LC $\Delta$ nd (nm) | Biaxial compensation film Ro (nm) | Biaxial compensation film Rth (nm) | TAC compensation film Rth (nm) |
|---|---|---|---|
| [305.8, 324.3] nm | [48, 84] nm | [160, 280] nm | [Y1, Y2] nm |

Figure 8:
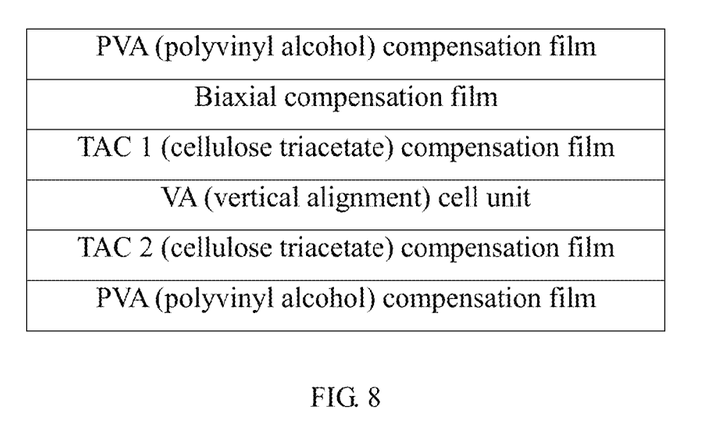
FIG. 8 is a schematic diagram illustrating compensation structure 5 with a single biaxial compensation film in the present invention.
Figure 9:
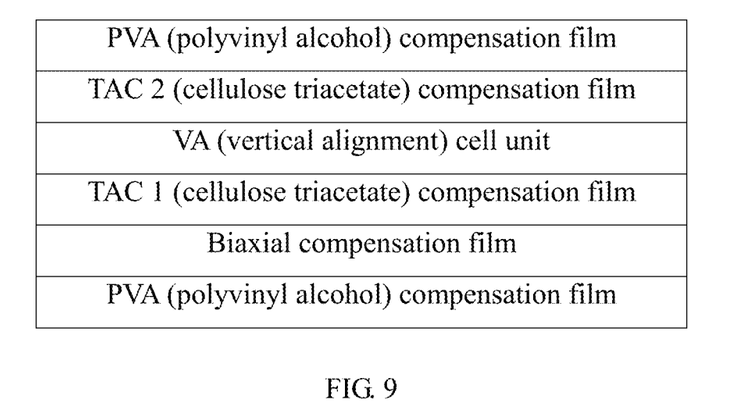
FIG. 9 is a schematic diagram illustrating compensation structure 6 with a single biaxial compensation film in the present invention.

When the compensation structures of the optical compensation film group are shown as FIG. 8 and FIG. 9, the compensation value Rth of the TAC compensation film equals to a compensation value Rth of a TAC1 compensation film plus a compensation value Rth of a TAC2 compensation film.

Through the implementation of the present invention, at the wavelength of 550 nm, the LC $\Delta$nd (liquid crystal optical path difference) in the range of [305.8 nm, 324.3 nm], and the liquid crystal pretilt angle in the range of [85°, 90°), the vertical alignment LCD can achieve ideal light leakage effect in the dark state by reasonable match of the compensation value Ro of the in-plane optical path difference of the biaxial compensation film, the compensation value Rth of the out-of-plane optical path difference of the biaxial compensation film, and the compensation value Rth of the TAC compensation film.

Correspondingly, the present invention also provides a method for reducing light leakage in the dark state for a vertical alignment LCD using an optical compensation film group, and the optical compensation film group comprises a biaxial compensation film and a TAC compensation film. The method comprises steps of: adjusting a compensation value Ro of an in-plane optical path difference of the biaxial compensation film in the range of 48 nm$\leq$Ro$\leq$84 nm, adjusting a compensation value Rth of an out-of-plane optical path difference of the biaxial compensation film in the range 160 nm$\leq$Rth$\leq$280 nm, and adjusting a compensation value Rth of the TAC compensation film in the range of Y1$\leq$Rth$\leq$Y2.

In the specific implementation, there are three ways to adjust the compensation values of the biaxial compensation film and the TAC compensation film:

The first:

When refractive index values Nx, Ny, Nz of the biaxial compensation film are known. Adjusting a thickness of the biaxial compensation film according to a following formula to produce the compensation value Ro of the in-plane optical path difference of the biaxial compensation film in the range of 48 nm≤Ro≤84 nm, the compensation value Rth of the out-of-plane optical path difference of the biaxial compensation film in the range of 160 nm≤Rth≤280 nm, the following formula:

$$Ro=(Nx-Ny)*d$$

$$Rth=[(Nx+Ny)/2-Nz]*d$$

wherein, Nx representing the refractive index value in a X direction which gives a maximum refractive index value in the plane of the biaxial compensation film, Ny representing the refractive index value in a Y direction which is orthogonal to the X direction in the plane of the biaxial compensation film, and Nz representing the refractive index value in a thickness direction of the biaxial compensation film.

When refractive index values Nx, Ny, Nz of the TAC compensation film are known, adjusting a thickness d of the TAC compensation film according to a following formula to produce the compensation value Rth of the TAC compensation film in the range of Y1≤Rth≤Y2, the formula:

$$Rth=[(Nx+Ny)/2-Nz]*d$$

wherein, Nx representing the refractive index value in a X direction which gives a maximum refractive index value in the plane of the TAC compensation film, Ny representing the refractive index value in a Y direction which is orthogonal to the X direction in the plane of the TAC compensation film, and Nz representing the refractive index value in a thickness direction of the TAC compensation film.

The second:

When a thickness d of the biaxial compensation film is known, according to a following formula:

$$Ro=(Nx-Ny)*d$$

$$Rth=[(Nx+Ny)/2-Nz]*d$$

wherein, Nx representing the refractive index value in a X direction which gives a maximum refractive index value in the plane of the biaxial compensation film, Ny representing the refractive index value in a Y direction which is orthogonal to the X direction in the plane of the biaxial compensation film, and Nz representing the refractive index value in a thickness direction of the biaxial compensation film.

Adjusting refractive index values Nx, Ny, Nz of the biaxial compensation film to produce the compensation value Ro of the in-plane optical path difference of the biaxial compensation film in the range of 48 nm≤Ro≤84 nm, the compensation value Rth of the out-of-plane optical path difference of the biaxial compensation film in the range of 160 nm≤Rth≤280 nm.

When a thickness d of the TAC compensation film is known, adjusting refractive index values Nx, Ny, Nz of the TAC compensation film according to a following formula to produce the compensation value Rth of the TAC compensation film in the range of Y1≤Rth≤Y2, the formula:

$$Rth=[(Nx+Ny)/2-Nz]*d$$

wherein, Nx representing the refractive index value in a X direction which gives a maximum refractive index value in the plane of the TAC compensation film, Ny representing the refractive index value in a Y direction which is orthogonal to the X direction in the plane of the TAC compensation film, and Nz representing the refractive index value in a thickness direction of the TAC compensation film.

The third:

First of all, adjusting the refractive index values Nx, Ny, Nz and the thickness d of the biaxial compensation film at the same time according to a following formula to produce the compensation value Ro of the in-plane optical path difference of the biaxial compensation film in the range of 48 nm≤Ro≤84 nm, the compensation value Rth of the out-of-plane optical path difference of the biaxial compensation film in the range of 160 nm≤Rth≤280 nm, the formula:

$$Ro=(Nx-Ny)*d$$

$$Rth=[(Nx+Ny)/2-Nz]*d$$

wherein, Nx representing the refractive index value in a X direction which gives a maximum refractive index value in the plane of the biaxial compensation film, Ny representing the refractive index value in a Y direction which is orthogonal to the X direction in the plane of the biaxial compensation film, and Nz representing the refractive index value in a thickness direction of the biaxial compensation film.

Then, adjusting refractive index values Nx, Ny, Nz, and a thickness d of the TAC compensation film at the same time according to a following formula to produce the compensation value Rth of the TAC compensation film in the range of Y1≤Rth≤Y2, the formula:

$$Rth=[(Nx+Ny)/2-Nz]*d$$

wherein, Nx representing the refractive index value in a X direction which gives a maximum refractive index value in the plane of the TAC compensation film, Ny representing the refractive index value in a Y direction which is orthogonal to the X direction in the plane of the TAC compensation film, and Nz representing the refractive index value in a thickness direction of the TAC compensation film.

Figure 10:
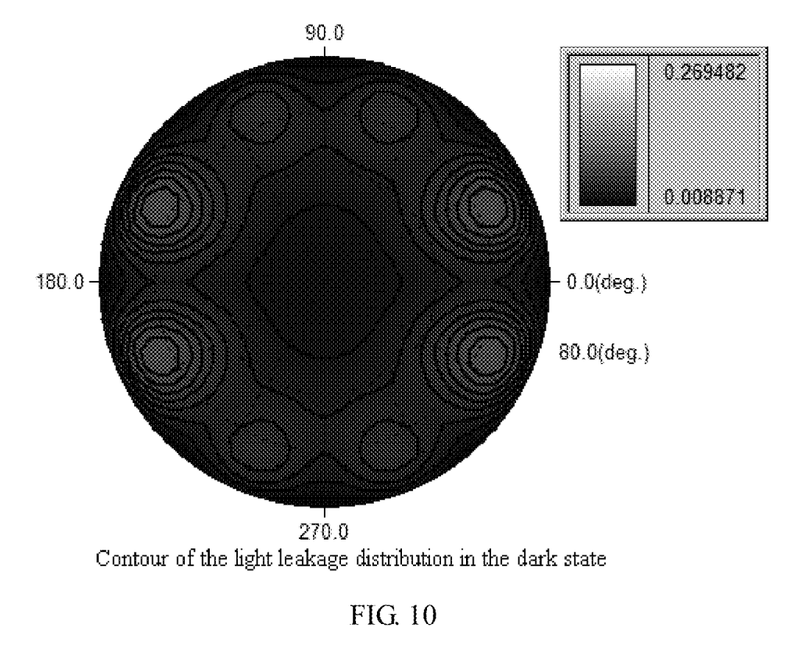
FIG. 10 is a light leakage distribution diagram in dark state generated by a compensation structure with a single biaxial compensation film in the present invention.

For an example, when selecting an LCΔnd=315.0 nm, a pretilt angle=89°, compensation values of the biaxial compensation film, Ro=66 nm, Rth=220 nm, the compensation value of the TAC compensation film, Rth=64.9 nm, a light leakage distribution diagram in the dark state is shown in FIG. 10.

By comparison of FIG. 10 and FIG. 3, it can visually see that the light leakage in the dark state of the present compensation structure with a single biaxial compensation film after improving is lower than the conventional compensation structure with a single biaxial compensation film in the dark state.

Implementation of the present invention can significantly improve the serious light leakage phenomenon caused by the conventional compensation structure with a single biaxial compensation film in the dark state, which can effectively improve the contrast and sharpness at the large viewing angles (not horizontal and vertical direction viewing angles), while reducing the costs.

The above content combines the preferred embodiments for detail description of the present invention. It is particularly pointed out that the above embodiments are only used to illustrate the present invention, and they are not used to limit the scope of the present invention. Other embodiments obtained under the premise of without paying creative labor by the person ordinary skill in the art are all belong to the claims of the present invention.

What is claimed is:

1. An optical compensation film group for a vertical alignment LCD, and for the vertical alignment LCD at a wavelength of 550 nm, an LCΔnd in the range of [305.8 nm, 324.3 nm], and a pretilt angle in the range of [85°, 90°], the optical compensation film group comprising:
   a biaxial compensation film having a compensation value Ro of an in-plane optical path difference in the range of 48 nm≤Ro≤84 nm and a compensation value Rth of an out-of-plane optical path difference in the range of 160 nm≤Rth≤280 nm; and
   a TAC compensation film having a compensation value Rth in the range of Y1≤Rth≤Y2, wherein:

$Y1=0.005505x^2-3.25016x+477.1;$ $Y2=-0.00625119x^2+1.762274x+32;$ and x representing the compensation value Rth of the out-of-plane optical path difference of the biaxial compensation film.

2. A method for reducing light leakage of a vertical alignment LCD using optical compensation film group, wherein the optical compensation film group comprises a biaxial compensation film and a TAC compensation film, and for the vertical alignment LCD at a wavelength of 550 nm, an LCΔnd in the range of [305.8 nm, 324.3 nm], and a pretilt angle in range of [85°, 90°], the method comprising steps of:
   adjusting a compensation value Ro of an in-plane optical path difference of the biaxial compensation film in the range of 48 nm≤Ro≤84 nm;
   adjusting a compensation value Rth of an out-of-plane optical path difference of the biaxial compensation film in the range of 160 nm≤Rth≤280 nm; and
   adjusting a compensation value Rth of the TAC compensation film in the range of Y1≤Rth≤Y2, wherein:

$Y1=0.005505x^2-3.25016x+477.1;$ $Y2=-0.00625119x^2+1.762274x+32;$ and x representing the compensation value Rth of the out-of-plane optical path difference of the biaxial compensation film.

3. The method according to claim 2, wherein, the step of adjusting the compensation value Ro of the in-plane optical path difference of the biaxial compensation film in the range of 48 nm≤Ro≤84 nm and the step of adjusting the compensation value Rth of the out-of-plane optical path difference of the biaxial compensation film in the range of 160 nm≤Rth≤280 nm comprises:
   when refractive index values Nx, Ny, Nz of the biaxial compensation film are known, adjusting a thickness d of the biaxial compensation film according to a following formula to produce the compensation value Ro of the in-plane optical path difference of the biaxial compensation film in the range of 48 nm≤Ro≤84 nm and the compensation value Rth of the out-of-plane optical path difference of the biaxial compensation film in the range of 160 nm≤Rth≤280 nm, the formula:

$Ro=(Nx-Ny)*d$ $Rth=[(Nx+Ny)/2-Nz]*d$ wherein, Nx representing the refractive index value in a X direction which gives a maximum refractive index value in the plane of the biaxial compensation film, Ny representing the refractive index value in a Y direction which is orthogonal to the X direction in the plane of the biaxial compensation film, and Nz representing the refractive index value in a thickness direction of the biaxial compensation film.

4. The method according to claim 2, wherein, the step of adjusting the compensation value Rth of the TAC compensation film in the range of Y1≤Rth≤Y2 comprises:
   when refractive index values Nx, Ny, Nz of the TAC compensation film are known, adjusting a thickness d of the TAC compensation film according to a following formula to produce the compensation value Rth of the TAC compensation film in the range of Y1≤Rth≤Y2, the formula:

$Rth=[(Nx+Ny)/2-Nz]*d$ wherein, Nx representing the refractive index value in a X direction which gives a maximum refractive index value in the plane of the TAC compensation film, Ny representing the refractive index value in a Y direction which is orthogonal to the X direction in the plane of the TAC compensation film, and Nz representing the refractive index in a thickness direction of the TAC compensation film.

5. The method according to claim 2, wherein, the step of adjusting the compensation value Ro of the in-plane optical path difference of the biaxial compensation film in the range of 48 nm≤Ro≤84 nm and adjusting the compensation value Rth of the out-of-plane optical path difference in the range of 160 nm≤Rth≤280 nm comprises:
   when a thickness d of the biaxial compensation film is known, adjusting refractive index value Nx, Ny, Nz of the biaxial compensation film according to a following formula to produce the compensation value Ro of the in-plane optical path difference of the biaxial compensation film in the range of 48 nm≤Ro≤84 nm, and the compensation value Rth of the out-of-plane optical path difference of the biaxial compensation film in the range of 160 nm≤Rth≤280 nm, the formula:

$Ro=(Nx-Ny)*d$ $Rth=[(Nx+Ny)/2-Nz]*d$ wherein, Nx representing the refractive index value in a X direction which gives a maximum refractive index in the plane of the biaxial compensation film, Ny representing the refractive index value in a Y direction which is orthogonal to the X direction in the plane of the biaxial compensation film, and Nz representing the refractive index value in a thickness direction of the biaxial compensation film.

6. The method according to claim 2, wherein, the step of adjusting the compensation value Rth of the TAC compensation film in the range of Y1≤Rth≤Y2 comprises:
   when a thickness d of the TAC compensation film is known, adjusting refractive index values Nx, Ny, Nz of the TAC compensation film according to a following formula to produce the compensation value Rth of the TAC compensation film in the range of Y1≤Rth≤Y2, the formula:

$Rth=[(Nx+Ny)/2-Nz]*d$ wherein, Nx representing the refractive index value in a X direction which gives a maximum refractive index value in the plane of the TAC compensation film, Ny representing the refractive index value in a Y direction which is orthogonal to the X direction in the plane of the TAC compensation film, and Nz representing the refractive index value in a thickness direction of the TAC compensation film.

7. The method according to claim 2, wherein, the step of adjusting the compensation value Ro of the in-plane optical path difference of the biaxial compensation film in the range of 48 nm≤Ro≤84 nm and adjusting the compensation value Rth of the out-of-plane optical path difference of the biaxial compensation film in the range of 160 nm≤Rth≤280 nm comprises:

adjusting refractive index values Nx, Ny, Nz, and a thickness d of the biaxial compensation film at the same time according to a following formula to produce the compensation value Ro of the in-plane optical path difference of the biaxial compensation film in the range of 48 nm≤Ro≤84 nm and the compensation value Rth of the out-of-plane optical path difference of the biaxial compensation film in the range of 160 nm≤Rth≤280 nm, the formula:

$Ro=(Nx-Ny)*d$ $Rth=[(Nx+Ny)/2-Nz]*d$ wherein, Nx representing the refractive index value in a X direction which gives a maximum refractive index in the plane of the biaxial compensation film, Ny representing the refractive index value in a Y direction which is orthogonal to the X direction in the plane of the biaxial compensation film, and Nz representing the refractive index value in a thickness direction of the biaxial compensation film.

8. The method according to claim 2, wherein, the step of adjusting the compensation value Rth of the TAC compensation film in the range of Y1≤Rth≤Y2 comprises:

adjusting refractive index values Nx, Ny, Nz, and a thickness d of the TAC compensation film at the same time according to a following formula to produce the compensation value Rth of the TAC compensation film in the range of Y1≤Rth≤Y2, the formula:

$Rth=[(Nx+Ny)/2-Nz]*d$ wherein, Nx representing the refractive index value in a X direction which gives a maximum refractive index value in the plane of the TAC compensation film, Ny representing the refractive index value in a Y direction which is orthogonal to the X direction in the plane of the TAC compensation film, and Nz representing the refractive index value in a thickness direction of the TAC compensation film.

* * * * *